(12) United States Patent
Choi et al.

(10) Patent No.: US 11,767,478 B1
(45) Date of Patent: Sep. 26, 2023

(54) SYSTEMS AND METHODS FOR PROCESSING HYDROCARBON FEEDSTOCKS

(71) Applicant: Saudi Arabian Oil Company, Dhahran (SA)

(72) Inventors: Ki-Hyouk Choi, Dhahran (SA); Young-Kyoung Ahn, Dhahran (SA); Abdullah Tariq AlAbdulhadi, Dhahran (SA); Saad Abdullah AlShahrani, Dhahran (SA); Chang-Woo Son, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/973,992

(22) Filed: Oct. 26, 2022

(51) Int. Cl.
| | |
|---|---|
| *C10G 61/04* | (2006.01) |
| *C10G 69/08* | (2006.01) |
| *B01J 3/00* | (2006.01) |
| *B01D 3/10* | (2006.01) |
| *B01D 17/02* | (2006.01) |
| *B01D 19/00* | (2006.01) |

(52) U.S. Cl.
CPC ............. *C10G 61/04* (2013.01); *B01D 3/10* (2013.01); *B01D 17/02* (2013.01); *B01D 19/00* (2013.01); *B01J 3/008* (2013.01); *C10G 69/08* (2013.01); *C10G 2300/107* (2013.01); *C10G 2300/1077* (2013.01); *C10G 2300/202* (2013.01); *C10G 2300/206* (2013.01); *C10G 2300/302* (2013.01); *C10G 2300/308* (2013.01); *C10G 2300/44* (2013.01); *C10G 2300/805* (2013.01)

(58) Field of Classification Search
CPC ............... C10G 7/06; C10G 2300/107; C10G 2300/1074; C10G 2300/202; C10G 2300/301; C10G 2300/308; C10G 2300/4081; B01D 3/10; B01D 3/106; B01D 3/40; B01D 19/0036; B01J 3/008
See application file for complete search history.

(56) References Cited

U.S. PATENT DOCUMENTS

| | | |
|---|---|---|
| 10,066,176 B2 | 9/2018 | Choi et al. |
| 2004/0004031 A1* | 1/2004 | Boger ................. B01J 23/38 |
| | | 422/600 |

(Continued)

FOREIGN PATENT DOCUMENTS

EP    3964557 A1 *  3/2022

OTHER PUBLICATIONS

Castaneda et al., "Combined process schemes for upgrading of heavy petroleum", Fuel, vol. 100, pp. 110-127, 2012.

(Continued)

*Primary Examiner* — Randy Boyer
*Assistant Examiner* — Juan C Valencia
(74) *Attorney, Agent, or Firm* — DINSMORE & SHOHL LLP (57) ABSTRACT

According to one or more embodiments described herein, a method for processing a hydrocarbon feedstock may include contacting a mixed feed with a solvent in a deasphalting system to form residue and deasphalted oil, contacting the deasphalted oil with supercritical water to form an upgraded oil, separating the upgraded oil into at least a light fraction and a heavy fraction, and combining at least a portion of the heavy fraction with the hydrocarbon feedstock to form the mixed feed.

20 Claims, 3 Drawing Sheets

(56) References Cited

U.S. PATENT DOCUMENTS

| | | | |
|---|---|---|---|
| 2006/0118463 A1* | 6/2006 | Colyar | C10G 67/049 |
| | | | 208/108 |
| 2017/0166819 A1 | 6/2017 | Choi et al. | |
| 2018/0171240 A1 | 6/2018 | Choi et al. | |
| 2019/0005548 A1 | 1/2019 | Peppel | |
| 2020/0270535 A1 | 8/2020 | Choi et al. | |
| 2021/0024846 A1 | 1/2021 | Brown et al. | |
| 2021/0198585 A1* | 7/2021 | Choi | B01J 3/008 |

OTHER PUBLICATIONS

Gould et al., "Natural Hydrogen Donors in Petroleum Resids", Energy & Fuels, vol. 21, pp. 1199-1204, 2007.
"Solvent Extraction in the Oil Industry", Petroleum Refining. vol. 2 Separation Processes, J.P. Wauquier, Publisher: IFP Editions Technip (Aug. 23, 2000), ISBN-13 978-2710807612. p. 401-405.

* cited by examiner

SYSTEMS AND METHODS FOR PROCESSING HYDROCARBON FEEDSTOCKS

TECHNICAL FIELD

Embodiments of the present disclosure generally relate to chemical processing and, more specifically, to systems and methods for processing hydrocarbon feedstocks.

BACKGROUND

Various fractions of crude oil may be upgraded by hydroprocessing, which generally includes contacting the crude oil fraction with a catalyst in the presence of hydrogen. Hydroprocessing may remove heteroatoms such as sulfur, nitrogen, oxygen, and metals from the crude oil fraction. Hydroprocessing may convert heavy molecules to lighter molecules, which may reduce the boiling point range of the crude oil fraction. Hydroprocessing may also hydrogenate unsaturated carbon-carbon bonds of aromatics and olefins in the crude oil fraction.

Although improvements have been made to hydroprocessing systems, some hydroprocessing systems may struggle to handle feedstocks that include a large quantity of heteroatoms and large molecules. For example, some hydroprocessing systems may experience deactivation of catalyst caused by poisoning from materials included in the feedstock. Additionally, metals and aromatic compounds in the feedstock may reduce the life of the hydroprocessing catalyst. Furthermore, the inclusion of less reactive heteroatom-containing molecules and polynuclear aromatics in the feedstock may call for hydroprocessing at severe operating conditions. While improvements have been made to hydroprocessing catalyst systems to address some of these concerns, there is a need for methods and systems to upgrade hydrocarbon feedstocks that may be fed to hydroprocessing systems.

SUMMARY

Embodiments of the present disclosure are directed to systems and methods for processing hydrocarbon feedstocks. Generally, hydrocarbon feedstocks may be upgraded by reducing the final boiling point of the feedstock and by using solvent extraction to remove certain heavy fractions from the feedstock. Some hydrocarbon feedstocks may have concentrated impurities in the heavy fractions of the feedstock. In some refineries, vacuum gas oil may be used as a feedstock for hydroprocessing, while the heavy fraction, sometimes referred to as vacuum residue, may be disposed of as solid fuel or asphalt. However, solvent extraction processes, such as solvent deasphalting processes, may separate this heavy fraction into deasphalted oil and residue, where most of the impurities are concentrated in the residue. However, conventional solvent deasphalting processes may have a relatively low yield of deasphalted oil.

Embodiments of the present application are directed to systems and methods of processing hydrocarbon feedstocks that comprise a solvent deasphalting step and a supercritical water treatment step, where at least a portion of the heavy fraction of the supercritical water treated product is recycled and mixed with the feedstock upstream of the solvent deasphalting step. Without intending to be bound by theory, according to some embodiments, utilizing the supercritical water treatment along with recycling the heavy fraction may allow the solvent deasphalting step to operate at a higher yield. This may result in an increased amount of hydrocarbon feedstock being upgraded for use in a downstream process, such as a hydroprocessing system.

In the embodiments described herein, a method for processing a hydrocarbon feedstock comprises contacting a mixed feed with a solvent in a deasphalting system to form residue and deasphalted oil, contacting the deasphalted oil with supercritical water to form an upgraded oil, separating the upgraded oil into at least a light fraction and a heavy fraction, and combining at least a portion of the heavy fraction with the hydrocarbon feedstock to form the mixed feed.

In the embodiments described herein, a system for processing a hydrocarbon feedstock comprises a deasphalting system configured to produce deasphalted oil and residue from a mixed feed stream and a supercritical water reactor system configured to produce an upgraded oil stream from the deasphalted oil. The supercritical water reactor system is in fluid communication with the deasphalting system. The system for processing a hydrocarbon feedstock comprises a separator configured to separate the upgraded oil stream into at least a heavy fraction and a light fraction, wherein the separator is in fluid communication with the supercritical water reactor, and a mixing device configured to mix at least a portion of the heavy fraction with the hydrocarbon feedstock to form the mixed feed stream. The mixing device is in fluid communication with the separator and the deasphalting system.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

For the purpose of describing the simplified schematic illustrations and descriptions of the relevant figures, the numerous valves, sensors, electronic controllers and the like that may be employed and well known to those of ordinary skill in the art of certain chemical processing operations are not included. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to systems and methods for processing hydrocarbon feedstocks. According to embodiments described herein, methods for processing hydrocarbon feedstocks may comprise contacting a mixed feed stream with a solvent in a deasphalting system to form residue and deasphalted oil, contacting the deasphalted oil with supercritical water in a supercritical water reactor system to form an upgraded oil stream, separating the upgraded oil stream into at least a light fraction and a heavy fraction in a separator, and combining at least a portion of the heavy fraction with the hydrocarbon feedstock to form the mixed feed.

Figure 1:
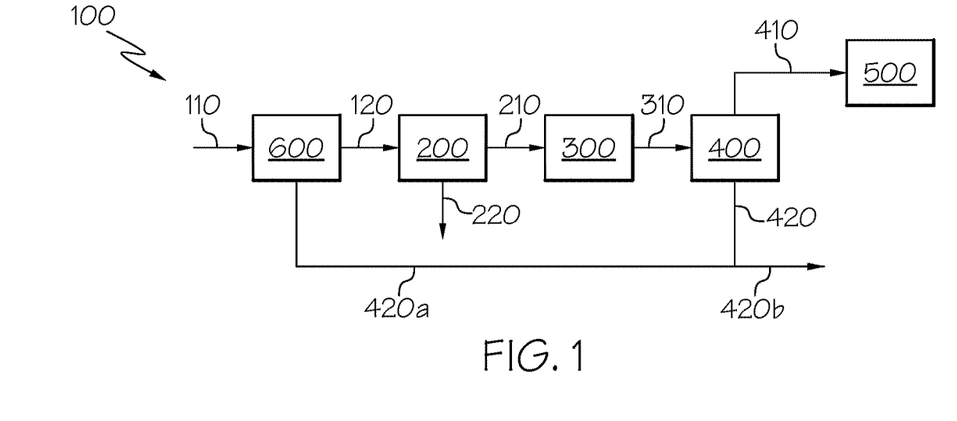
FIG. 1 schematically depicts a system for processing a hydrocarbon feedstock, according to one or more embodiments described herein.

Referring now to FIG. 1, a hydrocarbon feedstock 110 may be fed to a system 100 for processing the hydrocarbon feedstock 110. In one or more embodiments, less than or equal to 10 vol. % of the hydrocarbon feedstock 110 may have a boiling point of less than or equal to 600° F. at atmospheric pressure. For example, without limitation, less than or equal to 10 vol. %, 8 vol. %, 6 vol. %, 4 vol. %, 2 vol. %, or even 1 vol. % of the hydrocarbon feedstock 110 may have a boiling point of less than or equal to 600° F. at atmospheric pressure. In one or more embodiments, substantially all of the hydrocarbon feedstock 110 may have a boiling point of greater than or equal to 600° F. at atmospheric pressure. In one or more embodiments, greater than or equal to 10 vol. % of the hydrocarbon feedstock 110 may have a boiling point of greater than or equal to 650° F., greater than or equal to 700° F., greater than or equal to 750° F., greater than or equal to 800° F., greater than or equal to 850° F., or even greater than or equal to 900° F.

In one or more embodiments, the hydrocarbon feedstock 110 may have a $C_7$ asphaltene content of greater than 1.5 wt. % when measured according to ASTM D6560, Standard Test Method for Determination of Asphaltenes (Heptane Insolubles) in Crude Petroleum and Petroleum Products. For example, the hydrocarbon feedstock 110 may have a $C_7$ asphaltene content of greater than 1.5 wt. %, 2 wt. %, 3 wt. %, 4 wt. %, 5 wt. %, 6 wt. %, or even 7 wt. % when measured according to ASTM D6560. In one or more embodiments, the hydrocarbon feedstock 110 may have a $C_7$ asphaltene content of from 1.5 wt. % to 35 wt. %. For example, the hydrocarbon feedstock 110 may have a $C_7$ asphaltene content of from 1.5 wt. % to 35 wt. %, from 5 wt. % to 35 wt. %, from 10 wt. % to 35 wt. %, from 15 wt. % to 35 wt. %, from 20 wt. % to 35 wt. %, from 25 wt. % to 35 wt. %, from 30 wt. % to 35 wt. %, from 1.5 wt. % to 30 wt. %, from 1.5 wt. % to 25 wt. %, from 1.5 wt. % to 20 wt. %, from 1.5 wt. % to 15 wt. %, from 1.5 wt. % to 10 wt. %, from 1.5 wt. % to 5 wt. %, or any combination or subset of these ranges.

In one or more embodiments, the hydrocarbon feedstock 110 may have a Conradson carbon residue content of greater than 5 wt. %, when measured by ASTM D 189. For example, the hydrocarbon feedstock 110 may have a Conradson carbon residue content of greater than 5 wt. %, 6 wt. %, 7 wt. %, 8 wt. %, 9 wt. %, or even 10 wt. %. In one or more embodiments, the hydrocarbon feedstock 110 may have a Conradson carbon residue content of from 5 wt. % to 33 wt. %. For example, the hydrocarbon feedstock 110 may have a Conradson carbon residue content of from 5 wt. % to 33 wt. %, from 10 wt. % to 33 wt. %, from 15 wt. % to 33 wt. %, from 20 wt. % to 33 wt. %, from 25 wt. % to 33 wt. %, from 30 wt. % to 33 wt. %, from 5 wt. % to 30 wt. %, from 5 wt.

% to 25 wt. %, from 5 wt. % to 20 wt. %, from 5 wt. % to 15 wt. %, from 5 wt. % to 10 wt. %, or any combination or subset of these ranges.

In some embodiments, the hydrocarbon feedstock 110 may have a Conradson carbon residue content that is generally in the range of feedstock used in coking processes. Coking processes may result in lesser yield and quality of liquid products than hydroprocessing. The systems and methods for processing hydrocarbons described herein may result in a hydrocarbon stream that is suitable for use in hydroprocessing as opposed to coking processes.

In one or more embodiments, the hydrocarbon feedstock 110 may have an American Petroleum Institute (API) gravity of less than 22°, measured by ASTM D 287. For example, the hydrocarbon feedstock 110 may have an API gravity of less than 20°, less than 18°, less than 16°, less than 14°, less than 12°, or even less than 10°. In one or more embodiments, the hydrocarbon feedstock 110 may have an API gravity from 1° to 22°. For example, the hydrocarbon feedstock 110 may have an API gravity from 1° to 22°, from 5° to 22°, from 10° to 22°, from 15° to 22°, from 20° to 22°, from 1° to 20°, from 1° to 15°, from 1° to 10°, from 1° to 5°, or any combination or subset of these ranges.

The hydrocarbon feedstock 110 may comprise hydrocarbons from the distillation of hydrocarbons derived from petroleum, coal liquid, waste plastics, or even biomaterials. The hydrocarbon feedstock 110 may comprise hydrocarbons from refining process, including but not limited to, a visbreaker, hydrocracker, fluid catalytic cracking, resid fluid catalytic cracking, and steam cracking. The hydrocarbon feedstock 110 may comprise whole range crude oil, distilled crude oil, residue oil, topped crude oil, product streams from oil refineries liquefied coals, liquid products recovered from tar sands, bitumens, oil shale, asphaltenes, and biomass. In one or more embodiments, the hydrocarbon feedstock 110 may comprise vacuum residue, atmospheric residue, or a mixture of vacuum residue and atmospheric residue from the distillation of crude oil.

In one or more embodiments, the hydrocarbon feedstock 110 may be mixed with at least a portion of the heavy fraction 420a to form a mixed feed 120. The heavy fraction 420a will be described in greater detail herein. Referring to FIG. 1, the hydrocarbon feedstock 110 and the heavy fraction 420a may be mixed in a mixing unit 600. The mixing unit 600 may be any device or structure suitable for mixing the hydrocarbon feedstock 110 with the heavy fraction 420a to produce a mixed feed 120. For example, without limitation, the mixing unit 600 may comprise an inline mixer, a T fitting, a mixing vessel, or a combination of these.

In one or more embodiments, a ratio of the heavy fraction 420a to the hydrocarbon feedstock 110 in the mixed feed 120 may be from 1:1 to 1:50 based on the mass flow rates of the heavy fraction 420 and the hydrocarbon feedstock 110 fed to the mixing unit 600. For example, without limitation, the ratio of the heavy fraction 420a to the hydrocarbon feedstock 110 in the mixed feed 120 may be from 1:1 to 1:50, from 1:5 to 1:50, from 1:10 to 1:50, from 1:20 to 1:50, from 1:30 to 1:50, from 1:40 to 1:50, from 1:1 to 1:40, from 1:1 to 1:30, from 1:1 to 1:20, from 1:1 to 1:10, from 1:1 to 1:5, or any combination or subset of these ranges. In one or more embodiments, the ratio of the heavy fraction 420a to the hydrocarbon feedstock 110 in the mixed feed 120 may be from 1:3 to 1:10. Without intending to be bound by theory, the ratio of the recycled heavy fraction 420a to the hydrocarbon feedstock 110 may affect the viscosity of the mixed feed 120.

In one or more embodiments, the mixed feed 120 may have a kinematic viscosity from 10 centistokes (cSt) to 10,000 cSt at 100° C. For example, the mixed feed 120 may have a kinematic viscosity from 10 cSt to 10,000 cSt, from 20 cSt to 10,000 cSt, from 30 cSt to 10,000 cSt, from 40 cSt to 10,000 cSt, from 50 cSt, to 10,000 cSt, from 100 cSt to 10,000 cSt, from 500 cSt to 10,000 cSt, from 1,000 cSt to 10,000 cSt, from 2,000 cSt to 10,000 cSt, from 3,000 cSt to 10,000 cSt, from 4,000 cSt to 10,000 cSt, from 5,000 cSt to 10,000 cSt, from 6,000 cSt to 10,000 cSt, from 7,000 cSt to 10,000 cSt, from 8,000 cSt to 10,000 cSt, from 9,000 cSt to 10,000 cSt, from 10 cSt to 9,000 cSt, from 10 cSt to 8,000 cSt, from 10 cSt to 7,000 cSt, from 10 cSt to 6,000 cSt, from 10 cSt to 5,000 cSt, from 10 cSt to 4,000 cSt, from 10 cSt to 3,000 cSt, from 10 cSt to 2,000 cSt, from 10 cSt to 1,000 cSt, from 10 cSt 500 cSt, from 10 cSt to 100 cSt, from 10 cSt to 50 cSt, from 10 cSt to 40 cSt, from 10 cSt to 30 cSt, from 10 cSt to 20 cSt, or any combination or subset of these ranges. In one or more embodiments, the mixed feed 120 may have a kinematic viscosity from 30 cSt to 7,000 cSt at 100° C. Without intending to be bound by theory, the kinematic viscosity of the mixed feed 120 may affect the efficiency of the extraction. If the kinematic viscosity of the mixed feed 120 from 10 cSt to 10,000 cSt at 100° C., then the efficiency of the separation of deasphalted oil 210 from residue 220 in the solvent deasphalting system 200 may be improved.

Still referring to FIG. 1, the system 100 for processing a hydrocarbon feedstock 110 may include a solvent deasphalting system 200 configured to produce deasphalted oil 210 and residue 220 from a mixed feed 120. In one or more embodiments, the solvent deasphalting system 200 may be any suitable solvent deasphalting system known in the art. For example, without limitation, the solvent deasphalting system may comprise a process comparable to KBR's ROSE process, UOP's DEMEX process, or UOP/Forster-Wheeler's SDA process.

Without intending to be bound by theory, solvent deasphalting system 200 may utilize selective solubility of hydocarbons in light paraffinic solvent to separate asphaltenes from a hydrocarbon stream, such as mixed feed 120. Asphaltene having condensed aromatic structures may be flocculated by paraffinic solvents, such as propane, butane, and pentane. Impurities in the mixed feed 120 may be concentrated in the asphaltene fraction, residue 220, and separation of at least a portion of the asphaltene from a mixed feed 120 may result in a deasphalted oil 210 with a lower content of impurities. This deasphalted oil 210 may be a suitable feedstock for mild hydroprocessing. However, solvent deasphalting systems 200 may have a wide range of operating conditions that determine the quality and yield of the deasphalted oil 210. Without intending to be bound by theory, the type of solvent used in the solvent deasphalting system 200 may affect the yield and quantity of deasphalted oil 210. For example, without limitation, the use of lighter solvents, such as propane, may result in a lesser yield of deasphalted oil 210 while the use of heavier solvents, such as butane or pentante, may result in a greater yield of deasphalted oil 210. Furthermore, deasphalted oil 210 produced using lighter solvents may comprise fewer impurities than deasphalted oil 210 produced using heavier solvents. In other words, a solvent deasphalting system 200 operated to produce a high yield of deasphalted oil 210 may produce deasphalted oil 210 that is relatively high in impurities. Without intending to be bound by theory, the inclusion of a supercritical water reactor system 300 downstream of the solvent deasphalting system 200 may allow for deasphalted oil 210 comprising a higher level of impurities to be processed into suitable feedstock for hydroprocessing units.

In one or more embodiments described herein, the solvent utilized in the solvent deasphalting system 200 may comprise propane, butane, pentane, or a combination thereof. In one or more embodiments, the solvent may comprise propane, n-butane, iso-butane, or n-penane. In one or more embodiments, the solvent comprises pentane.

In one or more embodiments, the volume ratio (volume: volume) of solvent to the mixed feed 120 may be from 3:1 to 10:1. For example, the volume ratio of the solvent to the mixed feed 120 may be from 3:1 to 10:1, from 4:1 to 10:1, from 5:1 to 10:1, from 6:1 to 10:1, from 7:1 to 10:1, from 8:1 to 10:1, from 9:1 to 10:1, from 3:1 to 9:1, from 3:1 to 8:1, from 3:1 to 7:1, from 3:1 to 6:1, from 3:1 to 5:1, from 3:1 to 4:1 or any combination or subset of these ranges.

In one or more embodiments, the yield of deasphalted oil 210 from the solvent deasphalting system 200 may be from 5 wt. % to 90 wt. % based on the mass of the mixed feed 120. For example, without limitation, the yield of deasphalted oil 210 may be from 5 wt. % to 90 wt. %, from 15 wt. % to 90 wt. %, from 25 wt. % to 90 wt. %, from 35 wt. % to 90 wt. %, from 45 wt. % to 90 wt. %, from 55 wt. % to 90 wt. %, from 65 wt. % to 90 wt. %, from 75 wt. % to 90 wt. %, from 85 wt. % to 90 wt. %, from 5 wt. % to 80 wt. %, from 5 wt. % to 70 wt. %, from 5 wt. % to 60 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, or any combination or sub-set of these ranges, based on the mass of the mixed feed 120. In one or more embodiments, the yield of the deasphalted oil 210 from the solvent deasphalting system may be from 25 wt. % to 85 wt. % based on the mass of the mixed feed 120. In one or more embodiments, the yield of the deasphalted oil 210 from the solvent deasphalting system may be from 30 wt. % to 80 wt. % based on the mass of the mixed feed 120.

The deasphalted oil 210 may comprise a reduced amount of asphaltene relative to the asphaltene content of the mixed feed 120. In one or more embodiments, the deasphalted oil 210 may comprise at least 30 wt. % less asphaltene than the mixed feed 120. For example, without limitation, the deasphalted oil 210 may comprise at least 30 wt. % at least 40 wt. % at least 50 at least 60 or even at least 70 wt. % less asphaltene than the mixed feed 120. The asphaltene content of the mixed feed 120 and the deasphalted oil 210 may be measured according to ASTM D6560, Standard Test Method for Determination of Asphaltenes (Heptane Insolubles) in Crude Petroleum and Petroleum Products. In one or more embodiments, the deasphalted oil 210 may comprise from 60 wt. % to 95 wt. % less asphaltene than the mixed feed 120. For example, the deasphalted oil 210 may comprise from 60 wt. % to 95 wt. %, from 65 wt. % to 95 wt. %, from 70 wt. % to 95 wt. %, from 75 wt. % to 95 wt. %, from 80 wt. % to 95 wt. %, from 85 wt. % to 95 wt. %, from 90 wt. % to 95 wt. %, from 60 wt. % to 90 wt. %, from 60 wt. % to 85 wt. %, from 60 wt. % to 80 wt. %, from 60 wt. % to 75 wt. %, from 60 wt. % to 70 wt. %, or from 60 wt. % to 65 wt. %, less asphaltene than the mixed feed 120.

Figure 2:
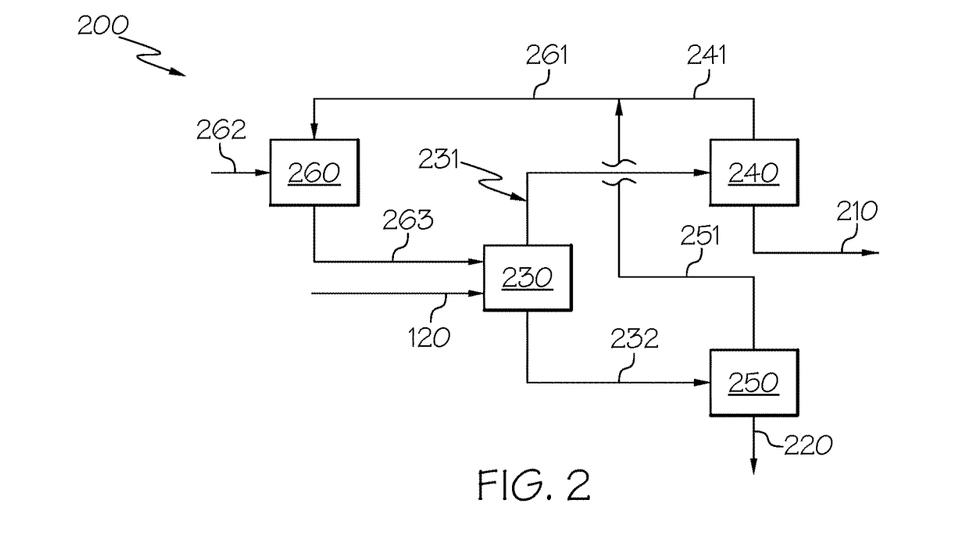
FIG. 2 schematically depicts a solvent deasphalting system according to one or more embodiments described herein.

Referring now to FIG. 2, the solvent deasphalting system 200 of FIG. 1, according to one or more embodiments, is shown in greater detail. The solvent deasphalting system 200 may comprise an extractor 230. The extractor 230 may be configured to contact a solvent 263 with the mixed feed 120 to form a deasphalted oil stream 231 and a residue stream 232. The extractor 230 may be any vessel suitable for contacting the solvent and mixed feed 120 and separating the deasphalted oil stream 231 and the residue stream 232.

The deasphalted oil stream 231 may be passed to a first separator 240. The first separator 240 may be configured to separate the solvent 241 from the deasphalted oil stream 210. The first separator 240 may be any separator suitable for separating the solvent 241 from the deasphalted oil 210. The deasphalted oil stream 210 may be passed from the solvent deasphalting system 200. The residue stream 232 may be passed to a second separator 250. The second separator 250 may be configured to separate the solvent 251 from the residue 220. The second separator 250 may be any separator suitable for separating the solvent 251 from the deasphalted oil 210. The residue 220 may be passed from the solvent deasphalting system 200. The solvent 241 and 251 may be combined into solvent stream 261 and recycled to a solvent reservoir 260. The solvent reservoir 260 may be in fluid communication with the extractor 230 and may supply solvent 263 to the extractor 230. Make-up solvent 262 may be added to the solvent reservoir 260.

It should be understood that the solvent deasphalting system of FIG. 2 is merely one embodiment of a solvent deasphalting system 200 that may be utilized in the system 100 for processing hydrocarbon feedstocks described in the present disclosure. It is contemplated that variations on the solvent deasphalting system 200 depicted in FIG. 2 may also be suitable for use in the system 100 for processing hydrocarbon feedstocks described herein. Furthermore, it should be understood that the system 100 for processing hydrocarbon feedstocks described herein is not necessarily limited to the use of the solvent deasphalting system 200 depicted in FIG. 2.

Referring again to FIG. 1, the system 100 for processing hydrocarbon feedstocks may comprise a supercritical water reactor system 300 in fluid communication with the solvent deasphalting system 200. The supercritical water reactor system 300 may be configured to contact the deasphalted oil 210 with supercritical water to produce an upgraded oil 310.

As describe herein, a "supercritical water" refers to water at a pressure and a temperature greater than that of its critical pressure and temperature. At a temperature and pressure greater than the critical temperature and pressure, the liquid and gas phase boundary may disappear, and the supercritical water may have characteristics of both fluid and gaseous substances. For example, distinct phases may not exist in the supercritical water and the fluid may exhibit the diffusion of a gas while dissolving materials like a liquid. Supercritical water may be able to dissolve organic compounds like an organic solvent and may have excellent diffusibility like a gas. Regulation of the temperature and pressure allows for continuous tuning of the properties of the supercritical water to be more liquid or more gas like. Supercritical water may have reduced density and lesser polarity, as compared to liquid-phase sub-critical water, thereby greatly extending the possible range of chemistry, which can be carried out in water.

Figure 3:
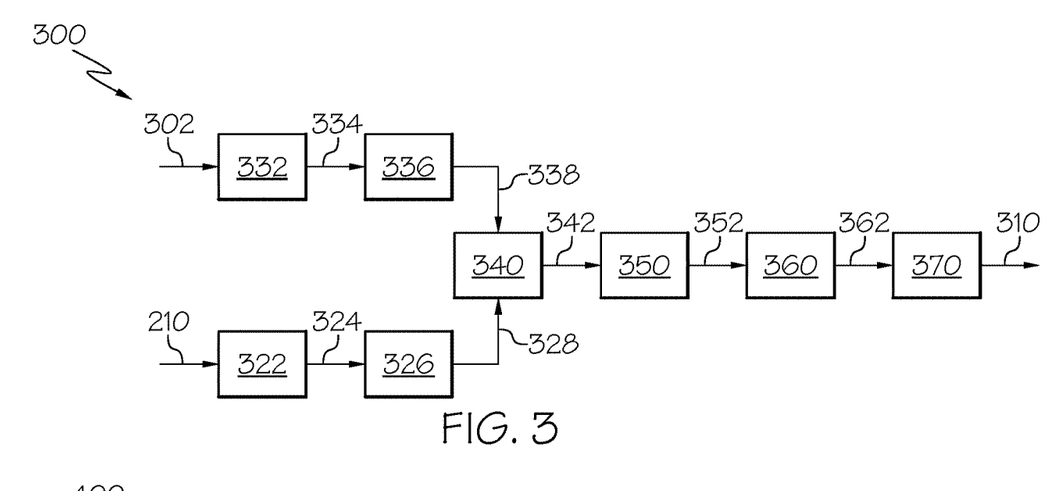
FIG. 3 schematically depicts a supercritical water reactor system according to one or more embodiments described herein.

Referring now to FIG. 3, a supercritical water reactor system 300 of FIG. 1 is depicted in greater detail. In the supercritical water reactor system 300, water 302 may be heated and pressurized to form supercritical water 338. Any suitable water source may be used. For example, without limitation, the water 302 may comprise demineralized water, distilled water, boiler feed water, or deionized water. In one or more embodiments, the water 302 may have a conductivity of less than 1 microsiemens/centimeter ($\mu$S/cm). For example, without limitation, the water 302 may have a conductivity of less than 1 $\mu$S/cm, less than 0.9 $\mu$S/cm, less than 0.8 $\mu$S/cm, less than 0.7 $\mu$S/cm, less than 0.6 $\mu$S/cm or even less than 0.5 $\mu$S/cm. In one or more embodiments, the water 302 may have a conductivity from 0 μS/cm to 1 μS/cm. In one or more embodiments, the water 302 may have a sodium content of less than 5 μg/L. For example, without limitation the water 302 may have a sodium content of less than 5 μg/L, less than 4 μg/L, less than 3 μg/L, less than 2 μg/L or even less than 1 μg/L. In one or more embodiments, the water 302 may have a sodium content from 0 μg/L to 5 μg/L. In one or more embodiments, the water may have a silica content of less than 3 μg/L. For example, without limitation, the water 302 may have a silica content of less than 3 μg/L, less than 2 μg/L, or even less than 1 μg/L. In one or more embodiments the water 302 may have a silica content of greater than or equal to 0 μg/L and less than 3 μg/L. Without intending to be bound by theory, inorganic compounds may be precipitated from supercritical water due to a low dielectric content of supercritical water. Precipitated salts and silica may plug lines in process equipment and cause corrosion. Conductivity may indicate the concentration of inorganic compounds in water. Accordingly, it may be beneficial for the feed water 302 to have a low conductivity to avoid precipitation of inorganic compounds.

The water 302 may be pressurized by a water pump 332 to form pressurized water 334. Water pump 332 may be any suitable pump for pressurizing water to a pressure above the critical pressure of water. For example, without limitation, the water pump 332 may be a plunger-type metering pump. In one or more embodiments, the pressure of the pressurized water 334 may be from 3000 pounds per square inch gauge (psig) to 6000 psig. For example, without limitation, the pressure of the pressurized water 334 may be from 3000 psig to 6000 psig, from 3000 psig to 5000 psig, from 3000 to 4000 psig, from 4000 psig to 6000 psig, from 5000 psig to 6000 psig, or any combination or subset of these ranges. In one or more embodiments, the pressure of the pressurized water 334 may be from 3200 psig to 5000 psig.

The pressurized water 334 may be heated by a water preheater 336 to form supercritical water 338. The water preheater 336 may be any heater suitable to raise the temperature of the pressurized water 334 above the critical temperature of water. For example, the water preheater 336 may be a natural gas fired heater, a heat exchanger, or an electric heater. In one or more embodiments, the water preheater 336 may comprise multiple heaters in parallel, in series, or both. The temperature of the supercritical water 338 may be from 374° C. to 600° C. For example, the temperature of the supercritical water may be from 374° C. to 600° C., from 400° C. to 600° C., from 450° C. to 600° C., from 500° C. to 600° C., from 550° C. to 600° C., from 374° C. to 550° C., from 374° C. to 500° C., from 374° C. to 450° C., from 374° C. to 400° C., or any combination or subset of these ranges.

Still referring to FIG. 3, deasphalted oil 210 may be pressurized by a deasphalted oil pump 322 to form a pressurized deasphalted oil 324. Deasphalted oil pump 322 may be any suitable pump for pressurizing deasphalted oil. For example, without limitation, the deasphalted oil pump 322 may be a plunger-type metering pump. In one or more embodiments, the pressure of the pressurized deasphalted oil 324 may be from 3000 psig to 6000 psig. For example, without limitation, the pressure of the pressurized deasphalted oil 324 maybe from 3000 psig to 6000 psig, from 3000 psig to 5000 psig, from 3000 to 4000 psig, from 4000 psig to 6000 psig, from 5000 psig to 6000 psig, or any combination or subset of these ranges. In one or more embodiments, the pressure of the pressurized deasphalted oil 324 may be from 3200 psig to 5000 psig.

The pressurized deasphalted oil 324 may be heated in a deasphalted oil preheater 326 to form a pressurized, heated deasphalted oil 328. The deasphalted oil preheater 326 may be any heater suitable to raise the temperature of the pressurized deasphalted oil 324. For example, the deasphalted oil preheater 326 may be a natural gas fired heater, a heat exchanger, or an electric heater. The deasphalted oil preheater 326 may comprise multiple heaters in parallel, in series, or both in one or more embodiments. The temperature of the pressurized, heated deasphalted oil 328 may be from 100° C. to 350° C. For example, the temperature of the pressurized, heated deasphalted oil 328 may be from 100° C. to 350° C., from 150° C. to 350° C., from 200° C. to 350° C., from 250° C. to 350° C., from 300° C. to 350° C., from 100° C. to 300° C., from 100° C. to 250° C., from 100° C. to 200° C., from 100° C. to 150° C., or any combination or subset of these ranged. In one or more embodiments, temperature of the pressurized, heated deasphalted oil 328 may be from 120° C. to 270° C.

Still referring to FIG. 3, the supercritical water 338 and the pressurized, heated deasphalted oil 328 may be mixed in a mixer 340 to create a mixed stream 342. The mixer 340 may be any type of mixing devise operable to mix the supercritical water 338 and the pressurized, heated deasphalted oil 328. For example, without limitation, the mixer 340 may comprise an inline mixer, a T fitting, an agitator equipped vessel, an ultrasonic mixer or a combination of these.

In one or more embodiments, a weight ratio of supercritical water 338 to the pressurized, heated deasphalted oil 328 in the mixed stream 342 may be from 1:10 to 10:1 at ambient temperature and pressure conditions. For example, without limitation, the weight ratio of supercritical water to the deasphalted oil 310 may be from 1:10 to 10:1, from 1:8 to 10:1, from 1:6 to 10:1, from 1:4 to 10:1, from 1:2 to 10:1, from 1:1 to 10:1, from 2:1 to 10:1, from 4:1 to 10:1, from 6:1 to 10:1, from 8:1 to 10:1, from 1:10 to 8:1, from 1:10 to 6:1, from 1:10 to 4:1, from 1:10 to 2:1, from 1:10 to 1:1, from 1:10 to 1:2, from 1:10 to 1:4, from 1:10 to 1:6, from 1:10 to 1:8, or any combination or subset of these ranges.

The mixed stream 342 may be passed from the mixer 340 to the supercritical water reactor 350. The operating temperature and pressure of the supercritical water reactor 350 may be above the critical temperature and the critical pressure of water. The supercritical water reactor 350 may comprise a tubular reactor or a tank-type reactor. In one or more embodiments, the supercritical water reactor 350 may comprise a tubular reactor oriented vertically, horizontally, in an inclined position or in a declined position or combined configuration.

The supercritical water reactor 350 may be sized so that the Reynolds number of water flowing through the reactor at the reaction condition is greater than 3000. For example, without limitation, the supercritical water reactor 350 may be sized so that the Reynolds number of water flowing through the reactor at the reaction condition is greater than 3000, 4000, 5000, or even 6000. In one or more embodiments, the residence time of water at the reaction condition flowing through the supercritical water reactor 350 may be from 0.1 minutes (min.) to 60 min. For example, without limitation, the residence time of water at the reaction condition flowing through the supercritical water reactor 350 may be from 0.1 min. to 60 min., from 1 min. to 60 min. from 10 min. to 60 min., from 20 min. to 60 min., from 30 min to 60 min., from 40 min. to 60 min., from 50 min. to 60 min., from 0.1 min. to 50 min., from 0.1 min. to 40 min., from 0.1 min. to 30 min., from 0.1 min. to 20 min., from 0.1 min. to 10 min., from 0.1 min. to 5 min., from 0.1 min. to 1 min., or any combination or subset of these ranges. In one or more embodiments, the supercritical water reactor may be sized so that the residence time of water at the reaction condition flowing through the supercritical water reactor 350 may be from 1 min. to 30 min.

The hydrocarbons in the combined feed stream 342 may undergo one or more reactions in the supercritical water reactor 350. For example, without limitation, the hydrocarbons may undergo cracking, dehydrogenation, aromatization, cyclization, isomerization, dealkylation, dimerization, condensation, desulfurization, denitrogenation, or demetallization reactions in the supercritical water reactor 350. In one or more embodiments, the hydrocarbons in the combined feed stream 342 may undergo more than one of these reactions in the supercritical water reactor 350.

Without intending to be bound by theory, a supercritical water process may utilize a radical-mediated mechanism for upgrading hydrocarbons by the reactions discussed hereinabove. It should be noted that supercritical water may stabilize radical species by a cage effect, which may suppress condensation, dimerization, and oligomerization reactions.

In one or more embodiments, the supercritical water process may convert at least a portion of the asphaltenes to maltenes. As described herein, "maltenes" are a hydrocarbon fraction that may be soluble in a paraffin solvent. However, the supercritical water process may also result in the production of "core" or "shaved" asphaltenes. As described herein, "core or shaved asphaltenes" refer to the aromatic core of asphaltene molecules. Without intending to be bound by theory, asphaltene may comprise donatable hydrogens, which are mostly associated with napthenic rings. These hydrogens may be released during the supercritical water treatment to produce more aromatic "core" or "shaved" asphaltenes. Accordingly, the heavy fraction of the product treated by supercritical water may have increased aromatic content, even though an overall lightening of the heavy fraction may occur during supercritical water treatment. Without intending to be bound by theory, the use of supercritical water process may not result in a product that is free from or substantially free from asphaltene. To reduce the asphaltene content of the heavy fraction of the hydrocarbons upgraded by the supercritical water reactor, the heavy fraction may be recycled to the solvent deasphalting unit so that the "core" or "shaved" asphaltenes formed in the supercritical water reactor may be removed.

Still referring to FIG. 3, the product 352 from the supercritical water reactor 350 may be passed to a cooling device 360 to form a cooled product 362. The cooling device 360 may be any cooler operable to cool the product 352 from the supercritical water reactor 350. For example, without limitation, the cooling device 360 may comprise an air cooler, a heat exchanger, a water cooler, or any other cooling device. The cooled product 362 may have a temperature below the critical temperature of water. In one or more embodiments, the cooled product 362 may have a temperature from 50° C. to 374° C. For example, the cooled product 362 may have a temperature from 50° C. to 374° C., from 50° C. to 350° C., from 50° C. to 300° C., from 50° C. to 250° C., from 50° C. to 200° C., from 50° C. to 150° C., from 50° C. to 100° C., from 100° C. to 374° C., from 150° C. to 374° C., from 200° C. to 374° C., from 250° C. to 374° C., from 300° C. to 374° C., from 350° C. to 374° C., or any combination or subset of these ranges.

The cooled product 362 may be passed from the cooling device 360 to a depressurizing device 370. The depressurizing device 370 may be operable to reduce the pressure of the cooled product 362 to form the upgraded oil 310. In one or more embodiments, the depressurizing device 370 may comprise a pressure regulator, a pressure control valve, or any other suitable means for regulating pressure. In one or more embodiments, the upgraded oil 310 may have a pressure from 0 psig to 290 psig. For example, the upgraded oil 310 may have a pressure from 0 psig to 290 psig, from 0 psig to 250 psig, from 0 psig to 200 psig, from 0 psig to 150 psig, from 0 psig to 100 psig, from 0 psig to 50 psig, from 50 psig to 290 psig, from 100 psig to 290 psig, from 150 psig to 290 psig, from 200 psig to 290 psig, from 250 psig to 290 psig, or any combination or subset of these ranges. In one or more embodiments, the temperature of the upgraded oil 310 may be substantially the same as the temperature of the cooled product 362.

It should be understood that the supercritical water reactor system 300 depicted in FIG. 3 is merely one embodiment of a supercritical water reactor system 300 that may be utilized in the system 100 for upgrading hydrocarbon feedstocks described in the present disclosure. It is contemplated that variations on the supercritical water reactor system 300 depicted in FIG. 3 may also be suitable for use in the system 100 for processing hydrocarbon feedstocks described herein. Furthermore, it should be understood that the system 100 for processing hydrocarbon feedstocks described herein is not necessarily limited to the use of the exact supercritical water reactor system 300 depicted in FIG. 3.

Referring again to FIG. 1, the system 100 for processing hydrocarbon feedstocks may comprise a separator 400 in fluid communication with the supercritical water reactor system 300. The separator 400 may be configured to separate the upgraded oil 310 into at least a light fraction 410 and a heavy fraction 420.

In one or more embodiments, the separator 400 may comprise multiple separators including but not limited to gas/liquid separators, water/oil separators, and distillation columns. The separator may be operable to separate gasses and water from the upgraded oil 310 and to separate the upgraded oil 310 into multiple fractions including at least a light fraction 410 and a heavy fraction 420.

Figure 4:
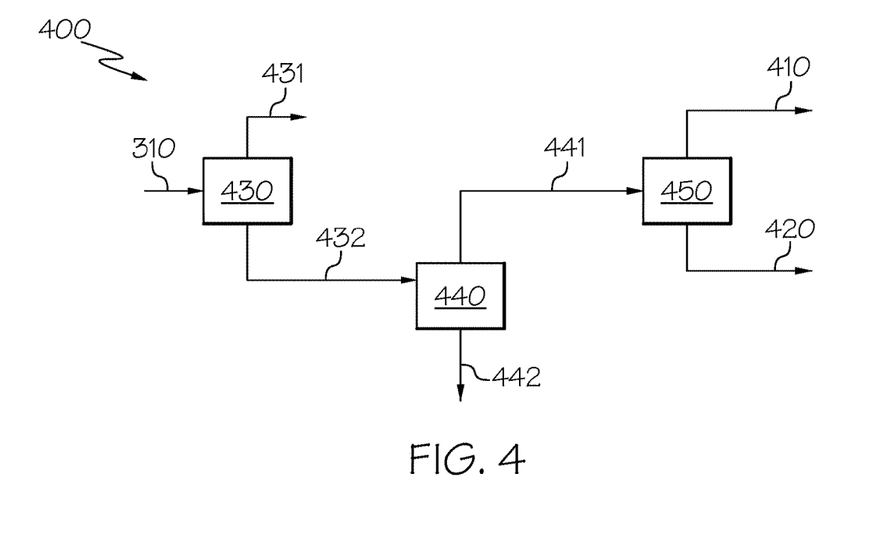
FIG. 4 schematically depicts a separator according to one or more embodiments described herein.

Referring now to FIG. 4, an embodiment of separator 400 of FIG. 1 is depicted in greater detail. The separator 400 may include a gas/liquid separator 430. The gas/liquid separator may be operable to separate one or more gasses 431 from the upgraded oil 310. The gas/liquid separator 430 may comprise any suitable gas/liquid separator. For example, without limitation, the gas/liquid separator 430 may comprise a flash drum or a degasser. The one or more gasses 431 may comprise one or more of $H_2$, $CH_4$, $H_2S$, CO, $CO_2$, $NH_3$, ethane, ethylene, propane, propylene, butane, butene, pentane, pentene, hexane, and hexane. A liquid stream 432 may be passed from the gas/liquid separator 430. In one or more embodiments, the liquid stream 432 may comprise water and hydrocarbons.

The separator 400 may further comprise a water/oil separator 440 in fluid communication with the gas/liquid separator 430. In one or more embodiments, the liquid stream 432 may be passed from the gas/liquid separator to the water/oil separator 440. The water/oil separator 440 may be any separator operable to separate at least a portion of the water in liquid stream 432 from the hydrocarbons in liquid stream 432 to form a hydrocarbon stream 441 and an aqueous stream 442. For example, without limitation, the water/oil separator 440 may comprise a phase separator or an API separator. The water/oil separator 440 may separate water from hydrocarbons with or without the use of a demulsifier. In one or more embodiments, the hydrocarbon stream 441 may comprise less than 0.5 wt. % water, less than 0.4 wt. % water, or even less than 0.3 wt. % water. In one or more embodiments, the hydrocarbon stream 441 may comprise from 0 wt. % water to 0.5 wt. % water.

Still referring to FIG. 4, the separator 400 may comprise a distillation column 450. The distillation column 450 may be operable to separate the hydrocarbon stream 441 by boiling point into at least a light boiling point fraction 410 and a heavy boiling point fraction 420. The distillation column 450 may be any suitable distillation column. For example, without limitation, the distillation column 450 may comprise an atmospheric distillation column or a vacuum distillation column. In one or more embodiments, the distillation column may be configured to produce multiple hydrocarbon fractions including but not limited to the light boiling point fraction 410 and the heavy boiling point fraction 420. In one or more embodiments, the distillation column 450 may be configured to separate the hydrocarbon stream 441 into only two fractions, a light boiling point fraction 410 and a heavy boiling point fraction 420.

In one or more embodiments, less than or equal to 10 vol. % of the heavy boiling point fraction 420 may have a boiling point of less than or equal to 600° F. at atmospheric pressure. For example, without limitation, less than or equal to 10 vol. %, 8 vol. %, 6 vol. %, 4 vol. %, 2 vol. %, or even 1 vol. % of the heavy boiling point fraction 420 may have a boiling point of less than or equal to 600° F. at atmospheric pressure. In one or more embodiments, substantially all of the heavy boiling point fraction 420 may have a boiling point of greater than or equal to 600° F. at atmospheric pressure. In one or more embodiments, greater than or equal to 10 vol. % of the heavy boiling point fraction 420 may have a boiling point of greater than or equal to 650° F., greater than or equal to 700° F., greater than or equal to 750° F., greater than or equal to 800° F., greater than or equal to 850° F., or greater than or equal to 900° F.

Referring again to FIG. 1, at least a portion of the heavy boiling point fraction 420a may be recycled and mixed with the hydrocarbon feed 110. In one or more embodiments, at least 50% of the heavy boiling point fraction 420 may be recycled and mixed with the hydrocarbon feed 110. The remainder of the heavy boiling point fraction 420b may be passed from the system 100 for further processing. For example, the remainder of the heavy boiling point fraction 420b may be passed to a coker or may be mixed with a portion of the light fraction 410 for additional downstream processing.

Without intending to be bound by theory, recycling at least a portion of the heavy boiling point fraction 420a to be mixed with the hydrocarbon feedstock 110 upstream of the solvent deasphalting unit 200 may allow for asphaltenes formed in the supercritical water reactor system 300 to be removed from the system 100. Without intending to be bound by theory, the asphaltenes formed in the supercritical water reactor may be removed from the mixed feedstock 120 in residue stream 220 after being processed in the solvent deasphalting unit 200. Without intending to be bound by theory, recycling a portion of the heavy fraction 420a may increase the aromaticity of the mixed feed 120 being passed to the solvent deasphalting unit 200. This may enable the solvent deasphalting unit 200 to operate at a higher yield without facing operational challenges such as the plugging of process lines. Furthermore, increased aromaticity of the mixed feedstock 120 may result in residue 220 exiting the solvent deasphalting unit 200 having a lower viscosity. This may reduce the amount of expensive cutterstock needed for the residue 220 to meet asphalt specifications.

Still referring to FIG. 1, the light fraction 410 may be passed to a downstream processing system 500. Downstream processing of the light fraction 410 may comprise one or more of hydroprocessing, cracking, fluid catalytic cracking, resid fluid catalytic cracking, and lube base oil production processes. In one or more embodiments the downstream processing system 500 may be a hydroprocessing system. In one or more embodiments, at least a portion of the remaining heavy fraction 420b may be mixed with the light fraction 410 prior to the downstream processing system 500.

EXAMPLES

The various embodiments of methods and systems for processing hydrocarbon feedstocks will be further clarified by the following examples. The examples are illustrative in nature, and should not be understood to limit the subject matter of the present disclosure.

Example 1— Comparative Example

Figure 5:
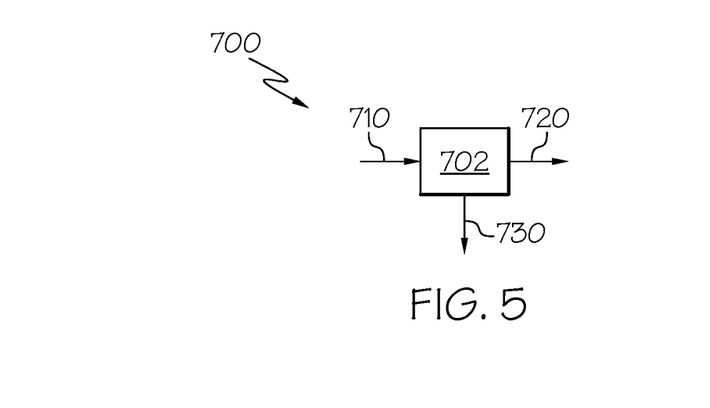
FIG. 5 schematically depicts a comparative solvent deasphalting system according to the embodiment of Example 1, described herein.

A solvent deasphalting system 700 of Example 1 is depicted in FIG. 5. A vacuum residue 710 (VR Feed 710) having the properties listed in Table 1 was fed to a solvent deasphalting unit 702. The mass flow rate of the vacuum residue 710 was 100 kg/hr. The solvent deasphalting unit 702 operated at a 34 wt. % lift such that a yield of deasphalted oil 720 was 34% based on the mass of the vacuum residue 710. The mass flow rate of deasphalted oil 720 exiting the solvent deasphalting unit 702 was 34 kg/hr, and the mass flow rate of residue 730 exiting the solvent deasphalting unit 702 was 66 kg/hr. The composition of the deasphalted oil 720 (DAO 720) is also listed in Table 1.

TABLE 1

Composition of Vacuum Residue 710 and Deasphalted Oil 720

|  | VR FEED (710) | DAO (720) |
| --- | --- | --- |
| Lift(wt) |  | 34% |
| API | 5.32 | 21.3 |
| S, wt. % | 4.21 | 2.29 |
| N, wt. % | 0.42 | 0.09 |
| Con Carbon, wt. % | 24.9 | 1.1 |
| C7 Insoluble (C7-asphaltene), wt. % | 8.00 | <0.1 |
| Ni, wppm | 25.5 | <1.0 |
| V, wppm | 49.8 | <1.0 |
| Ni + V, wppm | 75.3 | <1.0 |
| Visc, cSt @100° C. | 696.0 | 51.2 |
| Distillation(F) by SIMDIS |  |  |
| 5 | 1061 | 891 |
| 10 | 1085 | 937 |
| 20 | 1121 | 989 |
| 30 | 1167 | 1012 |
| 40 | 1188 | 1036 |
| 50 | 1241 | 1069 |
| 60 | 1289 | 1078 |
| 70 | 1392 | 1114 |
| 80 | 1538 | 1154 |
| 90 | 1679 | 1179 |

Figure 6:
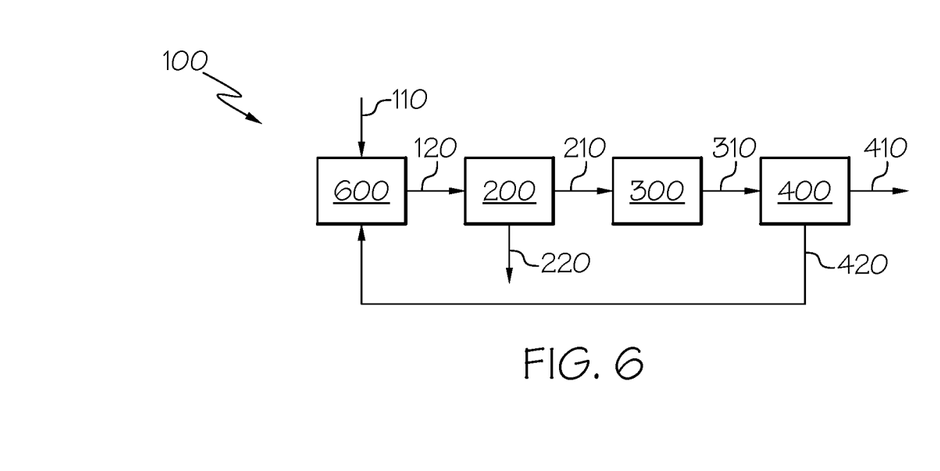
FIG. 6 schematically depicts a system for processing hydrocarbon feedstock according to the embodiment of Example 2, described herein.

Example 2— Processing Feedstock Using Solvent Deasphalting and Supercritical Water Treatment A system 100 for processing a hydrocarbon feedstock according to Example 2 is depicted in FIG. 6. A vacuum residue 110 was mixed with a heavy fraction 420 in mixer 600 to form a solvent deasphalting feed 120. The vacuum residue 110 has the same properties as the vacuum residue of Example 1 that are listed in Table 1. The mass flow rate of the vacuum residue 110 to the mixer 600 was 88.7 kg/hr. The mass flow rate of the heavy boiling point fraction 420 to the mixer was 11.3 kg/hr. The compositions of the heavy fraction 420 and the solvent deasphalting feed 120 are listed in Table 3.

The solvent deasphalting unit 200 was operated at a 50 wt. % lift such that the yield of deasphalted oil 210 from the solvent deasphalting unit was 50% based on the weight of the solvent deasphalting feed 120. The mass flow rate of deasphalted oil 210 exiting the solvent deasphalting unit 200 was 50 kg/hr. The mass flow rate of residue 230 exiting the solvent deasphalting unit 200 was 50 kg/hr. The composition of the deasphalted oil 210 is listed in Table 3.

The deasphalted oil 210 was passed to a supercritical water reactor system 300 where the deasphalted oil 210 was treated with supercritical water. The ratio of water to deasphalted oil 210 at ambient temperature and pressure was 1.5/1 by volume. The flow rate of water was 7.8 Barrels/day, and the flow rate of deasphalted oil 210 was 5.2 Barrels/day at atmospheric temperature and pressure. The supercritical water reactor system 300 included five tubular reactors in series, each having a 60.33 mm outer diameter and a 38.2 mm inner diameter. The residence time was about 127 seconds, calculated by assuming the density of the fluid in the reactor has the density of water at reaction conditions. The supercritical water and deasphalted oil 210 were contacted at a temperature of 376° C. and a pressure of 3900 psig. After the deasphalted oil 210 was treated with the supercritical water the product 310 was cooled and depressurized before being sent to a separator 400. The mass flow rate of the product 310 was 49.1 kg/hr. The composition of the supercritical water upgraded deasphalted oil in product stream 310 is given in Table 3.

The separator 400 included a gas/liquid separator followed by an oil/water separator. The mass balance around the supercritical water reactor system 300 and the separator 400 is given in Table 2.

TABLE 2

Supercritical Water Reactor System and Separator Mass Balance

| Feed to Supercritical Water Reactor System | |
|---|---|
| Feed | kg/hr |
| Water | 51.57 |
| DAO | 33.07 |
| Total | 84.64 |

| Products from Separators(Gas/Liquid and Oil/Water Separators) | |
|---|---|
| Product | kg/hr |
| Gas | 1.53 |
| Oil | 32.47 |
| Water | 50.64 |
| Total | 84.64 |

The product oil from the oil/water separator was subjected to vacuum distillation to produce a light fraction 410 and a heavy fraction 420. The yield of the light fraction 410 was 77 wt. % and the yield of the heavy fraction 420 was 23 wt. %. The composition of the light fraction 410 and the heavy fraction 420 are each given in Table 3. The heavy fraction 420 was recycled to mixer 600 where it was mixed with the vacuum residue 110 to form the solvent deasphalting feed 120. The mass flow rate of the heavy fraction 420 was 11.3 kg/hr. The light fraction 410 was passed to a hydrotreater, and the mass flow rate of the light fraction 410 was 37.8 kg/hr.

TABLE 3

Feed and Product Compositions

| | SDA Feed 120 | DAO 210 | SCW Upgraded DAO 310 | Light Fraction 410 | Heavy Fraction 420 |
|---|---|---|---|---|---|
| Lift(wt) | | 50% | | | |
| API | 5.8 | 15.3 | 19.1 | 21.78 | 9.91 |
| S, wt. % | 4.19 | 3.37 | 2.49 | 2.01 | 4.1 |
| N, wt. % | 0.41 | 0.22 | 0.14 | 0.1 | 0.3 |
| Con Carbon, wt. % | 24.47 | 8.72 | 4.62 | 1.01 | 12.5 |
| C7 Insoluble (C7-asphaltene), wt. % | 7.60 | 2.86 | 1.37 | <0.1 | 4.5 |
| Ni, wppm | 22.3 | 0.0 | <1.0 | <1.0 | <1.0 |
| V, wppm | 41.5 | 2.2 | <1.0 | <1.0 | <1.0 |
| Ni + V, wppm | 63.8 | 2.2 | <1.0 | <1.0 | <1.0 |
| Visc, cSt @100° C. | 612 | 32.1 | 7.0 | — | 320.0 |
| Distillation(F) by SIMDIS | | | | | |
| 5 | 1046 | 897 | 506 | 467 | 998 |
| 10 | 1071 | 946 | 583 | 545 | 1020 |
| 20 | 1096 | 1021 | 698 | 623 | 1044 |
| 30 | 1122 | 1047 | 773 | 715 | 1056 |
| 40 | 1173 | 1082 | 833 | 776 | 1067 |
| 50 | 1218 | 1125 | 886 | 815 | 1073 |
| 60 | 1272 | 1159 | 937 | 876 | 1096 |
| 70 | 1350 | 1201 | 986 | 925 | 1127 |
| 80 | 1494 | 1273 | 1041 | 951 | 1173 |
| 90 | 1638 | 1316 | 1116 | 975 | 1253 |

Example 3— Comparison of Hydrocracking Feeds

The deasphalted oil 720 of Example 1 and the light fraction 410 of Example 2 were each fed to a hydrocracking unit. The deasphalted oil 720 of Example 1 and the light fraction 410 of Example are compared in Table 4. As shown in Table 4, more hydrocracking feed was produced by the process of Example 2 that included the supercritical water processing step and the recycle of the heavy fraction to the solvent deasphalting unit. Specifically, the process of Example 2 resulted in 43% of the feedstock being converted to feed for the hydrocracing unit, while the comparative process of Example 1 resulted in 34% of the feedstock being converted to feed for the hydrocracking unit. Furthermore, the quality of the light fraction 410 of Example 2 was superior to that of the deasphalted oil 720 of Example 1 because the light fraction 410 of Example 2 had a lower sulfur content, a lower Conradson carbon content, a lower viscosity, and a lower boiling point.

TABLE 4

Comparison of Hydrocracking Feedstocks

| | DAO 720 Example 1 | Light Fraction 410 Example 2 |
|---|---|---|
| Mass fractio from VR feed | 34% | 43% |
| API | 21.3 | 21.78 |
| S, wt. % | 2.29 | 2.01 |
| N, wt. % | 0.09 | 0.1 |

TABLE 4-continued

Comparison of Hydrocracking Feedstocks

|  | DAO 720 Example 1 | Light Fraction 410 Example 2 |
|---|---|---|
| Con Carbon, wt. % | 1.1 | 1.01 |
| C7 Insoluble (C7-asphaltene), wt. % | <0.1 | <0.1 |
| Ni, wppm | <1.0 | <1.0 |
| V, wppm | <1.0 | <1.0 |
| Ni + V, wppm | <1.0 | <1.0 |
| Visc, cSt @100° C. | 51.2 | 16 |
| Distillation(F) by SIMDIS |  |  |
| 5 | 891 | 459 |
| 10 | 937 | 525 |
| 20 | 989 | 613 |
| 30 | 1012 | 666 |
| 40 | 1036 | 718 |
| 50 | 1069 | 763 |
| 60 | 1078 | 801 |
| 70 | 1114 | 826 |
| 80 | 1154 | 851 |
| 90 | 1179 | 876 |

According to a first aspect of the present disclosure, a method for processing a hydrocarbon feedstock may comprise contacting a mixed feed with a solvent in a deasphalting system to form residue and deasphalted oil; contacting the deasphalted oil with supercritical water to form an upgraded oil; separating the upgraded oil into at least a light fraction and a heavy fraction; and combining at least a portion of the heavy fraction with the hydrocarbon feedstock to form the mixed feed.

A second aspect of the present disclosure may include the first aspect, wherein less than or equal to 10 vol. % of the hydrocarbon feedstock has a boiling point less than or equal to 600° F. at atmospheric pressure.

A third aspect of the present disclosure may include either the first or second aspect, wherein the hydrocarbon feedstock has a $C_7$ asphaltene content of greater than 1.5 wt. %.

A fourth aspect of the present disclosure may include any of the first through third aspects, wherein the hydrocarbon feedstock has a Conradson carbon residue content of greater than 5 wt. %.

A fifth aspect of the present disclosure may include any of the first through fourth aspects, wherein the hydrocarbon feedstock comprises crude oil, vacuum residue, atmospheric residue, or a combination thereof.

A sixth aspect of the present disclosure may include any of the first through fifth aspects, wherein less than or equal to 10 vol. % of the heavy fraction has a boiling point less than or equal to 600° F. at atmospheric pressure.

A seventh aspect of the present disclosure may include any of the first through sixth aspects, wherein a weight ratio of the heavy fraction to the hydrocarbon feedstock in the mixed feed is from 1:50 to 1:1.

An eighth aspect of the present disclosure may include any of the first through seventh aspects, wherein a kinematic viscosity of the mixed feed is from 10 cSt to 10,000 cSt at a temperature of 100° C.

A ninth aspect of the present disclosure may include any of the first through eighth aspects, wherein the solvent comprises propane, butane, pentane, or a combination thereof.

A tenth aspect of the present disclosure may include any of the first through ninth aspects, wherein a yield of deasphalted oil is from 5 wt. % to 90 wt. % based on the mass of the mixed feed.

An eleventh aspect of the present disclosure may include any of the first through tenth aspects, wherein the deasphalted oil comprises at least 50% less asphaltene than the mixed feed.

A twelfth aspect of the present disclosure may include any of the first through eleventh aspects, wherein a weight ratio of the supercritical water to the deasphalted oil is from 1:10 to 10:1 at ambient temperature and pressure during the contacting of the deasphalted oil with the supercritical water.

A thirteenth aspect of the present disclosure may include any of the first through twelfth aspects, wherein cracking, dehydrogenation, aromatization, cyclization, isomerization, dealkylation, dimerization, condensation, desulfurization, denitrogenation, demetalization, or a combination of these, occurs during the contacting of the deasphalted oil with the supercritical water.

A fourteenth aspect of the present disclosure may include any of the first through thirteenth aspects, wherein the method further comprises hydroprocessing at least a portion of the light fraction.

According to a fifteenth aspect of the present disclosure, a system for processing hydrocarbon feedstocks may comprise a deasphalting system configured to produce deasphalted oil and residue from a mixed feed stream; a supercritical water reactor system configured to produce an upgraded oil stream from the deasphalted oil, wherein the supercritical water reactor system is in fluid communication with the deasphalting system; a separator configured to separate the upgraded oil stream into at least a heavy fraction and a light fraction, wherein the separator is in fluid communication with the supercritical water reactor; and a mixing device configured to mix at least a portion of the heavy fraction with the hydrocarbon feedstock to form the mixed feed stream, wherein the mixing device is in fluid communication with the separator and the deasphalting system.

A sixteenth aspect of the present disclosure may include the fifteenth aspect, wherein the deasphalting system comprises an extractor configured to contact a solvent and the mixed feed stream; a first separator configured to separate the solvent and the deasphalted oil; and a second separator configured to separate the solvent and the residue.

A seventeenth aspect of the present disclosure may include either the fifteenth or sixteenth aspect, wherein the supercritical water reactor system comprises a supercritical water reactor; a cooling device in fluid communication with the supercritical water reactor; and a depressurizing device in fluid communication with the cooling device.

An eighteenth aspect of the present disclosure may include the seventeenth aspect, wherein the supercritical water reactor system further comprises a deasphalted oil pump in fluid communication with the deasphalting system, the deasphalted oil pump configured to pressurize the deasphalted oil to form a pressurized deasphalted oil; a deasphalted oil preheater in fluid communication with the deasphalted oil pump, the deasphalted oil preheater configured to heat the pressurized deasphalted oil to form a heated and pressurized deasphalted oil; a water pump configured to pressurize a water stream to a pressure greater than the critical pressure of water to form a pressurized water stream; and a water preheater in fluid communication with the water pump, the water preheater configured to heat the pressurized water stream to a temperature greater than the critical temperature of water to form a supercritical water stream.

A nineteenth aspect of the present disclosure may include the eighteenth aspect, wherein the supercritical water reactor system further comprises a mixer configured to mix the heated and pressurized deasphalted oil with the supercritical water to form a mixed stream, wherein the mixer is in fluid communication with the deasphalted oil preheater, the water preheater, and the supercritical water reactor.

A twentieth aspect of the present disclosure may include any of the fifteenth through nineteenth aspects, wherein the separator comprises a gas/liquid separator in fluid communication with the supercritical water reactor system, the gas/liquid separator configured to separate the upgraded oil stream into a gas stream and a liquid stream; a water/oil separator in fluid communication with the gas/liquid separator, the water/oil separator configured to separate the liquid stream into a hydrocarbon stream and a water stream; and a distillation column in fluid communication with the water/oil separator, the distillation column configured to separate the hydrocarbon stream into a least the light fraction and the heavy fraction.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

The invention claimed is:

1. A method for processing a hydrocarbon feedstock, the method comprising:
    contacting a mixed feed with a solvent in a deasphalting system to form residue and deasphalted oil;
    contacting the deasphalted oil with supercritical water to form an upgraded oil;
    separating the upgraded oil into at least a light fraction and a heavy fraction; and
    combining at least a portion of the heavy fraction with the hydrocarbon feedstock to form the mixed feed.

2. The method of claim 1, wherein less than or equal to 10 vol. % of the hydrocarbon feedstock has a boiling point less than or equal to 600° F. at atmospheric pressure.

3. The method of claim 1, wherein the hydrocarbon feedstock has a $C_7$ asphaltene content of greater than 1.5 wt. %.

4. The method of claim 1, wherein the hydrocarbon feedstock has a Conradson carbon residue content of greater than 5 wt. %.

5. The method of claim 1, wherein the hydrocarbon feedstock comprises crude oil, vacuum residue, atmospheric residue, or a combination thereof.

6. The method of claim 1, wherein less than or equal to 10 vol. % of the heavy fraction has a boiling point less than or equal to 600° F. at atmospheric pressure.

7. The method of claim 1, wherein a weight ratio of the heavy fraction to the hydrocarbon feedstock in the mixed feed is from 1:50 to 1:1.

8. The method of claim 1, wherein a kinematic viscosity of the mixed feed is from 10 cSt to 10,000 cSt at a temperature of 100° C.

9. The method of claim 1, wherein the solvent comprises pentane.

10. The method of claim 1, wherein a yield of deasphalted oil is from 5 wt. % to 90 wt. % based on the mass of the mixed feed.

11. The method of claim 1, wherein the deasphalted oil comprises at least 50% less asphaltene than the mixed feed.

12. The method of claim 1, wherein a weight ratio of the supercritical water to the deasphalted oil is from 1:10 to 10:1 at ambient temperature and pressure during the contacting of the deasphalted oil with the supercritical water.

13. The method of claim 1, wherein cracking, dehydrogenation, aromatization, cyclization, isomerization, dealkylation, dimerization, condensation, desulfurization, denitrogenation, demetalization, or a combination of these, occurs during the contacting of the deasphalted oil with the supercritical water.

14. The method of claim 1, further comprising hydroprocessing at least a portion of the light fraction.

15. A system for processing a hydrocarbon feedstock, the system comprising:
- a deasphalting system configured to produce deasphalted oil and residue from a mixed feed stream;
- a supercritical water reactor system configured to produce an upgraded oil stream from the deasphalted oil, wherein the supercritical water reactor system is in fluid communication with the deasphalting system;
- a separator configured to separate the upgraded oil stream into at least a heavy fraction and a light fraction, wherein the separator is in fluid communication with the supercritical water reactor; and
- a mixing device configured to mix at least a portion of the heavy fraction with the hydrocarbon feedstock to form the mixed feed stream, wherein the mixing device is in fluid communication with the separator and the deasphalting system.

16. The system of claim 15, wherein the deasphalting system comprises:
- an extractor configured to contact a solvent and the mixed feed stream;
- a first separator configured to separate the solvent and the deasphalted oil; and
- a second separator configured to separate the solvent and the residue.

17. The system of claim 15, wherein the supercritical water reactor system comprises:
- a supercritical water reactor;
- a cooling device in fluid communication with the supercritical water reactor; and
- a depressurizing device in fluid communication with the cooling device.

18. The system of claim 17, wherein the supercritical water reactor system further comprises:
- a deasphalted oil pump in fluid communication with the deasphalting system, the deasphalted oil pump configured to pressurize the deasphalted oil to form a pressurized deasphalted oil;
- a deasphalted oil preheater in fluid communication with the deasphalted oil pump, the deasphalted oil preheater configured to heat the pressurized deasphalted oil to form a heated and pressurized deasphalted oil;
- a water pump configured to pressurize a water stream to a pressure greater than the critical pressure of water to form a pressurized water stream; and
- a water preheater in fluid communication with the water pump, the water preheater configured to heat the pressurized water stream to a temperature greater than the critical temperature of water to form a supercritical water stream.

19. The system of claim 18, wherein the supercritical water reactor system further comprises a mixer configured to mix the heated and pressurized deasphalted oil with the supercritical water to form a mixed stream, wherein the mixer is in fluid communication with the deasphalted oil preheater, the water preheater, and the supercritical water reactor.

20. The system of claim 15, wherein the separator comprises:
- a gas/liquid separator in fluid communication with the supercritical water reactor system, the gas/liquid separator configured to separate the upgraded oil stream into a gas stream and a liquid stream;
- a water/oil separator in fluid communication with the gas/liquid separator, the water/oil separator configured to separate the liquid stream into a hydrocarbon stream and a water stream; and
- a distillation column in fluid communication with the water/oil separator, the distillation column configured to separate the hydrocarbon stream into a least the light fraction and the heavy fraction.

* * * * *